United States Patent
Schweizer et al.

(10) Patent No.: US 9,684,304 B2
(45) Date of Patent: Jun. 20, 2017

(54) DEVICE FOR CONTROLLING A MOTOR VEHICLE

(71) Applicant: Robert Bosch GmbH, Stuttgart (DE)

(72) Inventors: Markus Schweizer, Vaihingen/Enz (DE); Carsten Gebauer, Boeblingen (DE); Bernd Mueller, Leonberg (DE); Christian Lasarczyk, Tamm (DE); Thomas Heinz, Stuttgart (DE); Jochen Ulrich Haenger, Neckarwestheim (DE); Rakshith Amarnath, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/002,119

(22) Filed: Jan. 20, 2016

(65) Prior Publication Data

US 2016/0216709 A1 Jul. 28, 2016

(30) Foreign Application Priority Data

Jan. 22, 2015 (DE) .......... 10 2015 201 010

(51) Int. Cl.
*G05D 1/00* (2006.01)
*B62D 15/02* (2006.01)

(52) U.S. Cl.
CPC ......... *G05D 1/0022* (2013.01); *B62D 15/027* (2013.01); *G05D 2201/0213* (2013.01)

(58) Field of Classification Search
CPC .................................. G06F 7/00; G05D 1/0022
See application file for complete search history.

(56) References Cited

U.S. PATENT DOCUMENTS

| | | | | |
|---|---|---|---|---|
| 5,493,508 A | * | 2/1996 | Dangelo | G06F 17/5045 716/103 |
| 9,146,559 B2 | * | 9/2015 | Kuss | B66F 9/063 |
| 9,354,070 B2 | * | 5/2016 | Thomson | B66F 9/063 |
| 2005/0288911 A1 | * | 12/2005 | Porikli | G06K 9/00335 703/2 |
| 2007/0193798 A1 | * | 8/2007 | Allard | H04L 67/12 180/169 |
| 2012/0123614 A1 | * | 5/2012 | Laws | G05B 19/4189 701/2 |
| 2012/0191332 A1 | * | 7/2012 | Sawhill | G08G 5/0013 701/120 |
| 2013/0169809 A1 | * | 7/2013 | Grignan | B63C 9/0005 348/148 |
| 2014/0164390 A1 | * | 6/2014 | Hampapur | G06F 17/3087 707/743 |
| 2015/0258683 A1 | * | 9/2015 | Izhikevich | B25J 9/163 700/250 |
| 2016/0195871 A1 | * | 7/2016 | Taylor | G05B 19/4103 700/114 |

FOREIGN PATENT DOCUMENTS

DE 10 2012 200 725 7/2013

* cited by examiner

*Primary Examiner* — Thomas Tarcza
*Assistant Examiner* — Alex C Dunn
(74) *Attorney, Agent, or Firm* — Gerard Messina

(57) ABSTRACT

A communication module for controlling a motor vehicle, which is configured for receiving vehicle-independent commands and converting these received commands into a target trajectory of the motor vehicle, and transmitting this target trajectory to an implementation module which is configured for associating a sequence of control commands for components of the motor vehicle with this transmitted target trajectory.

10 Claims, 3 Drawing Sheets

DEVICE FOR CONTROLLING A MOTOR VEHICLE

CROSS REFERENCE

The present application claims the benefit under 35 U.S.C. §119 of German Patent Application No. DE 102015201010.4 filed on Jan. 22, 2015, which is expressly incorporated herein by reference in its entirety.

FIELD

The present invention relates to a communication module for converting vehicle-independent commands into a target trajectory of a motor vehicle, and an implementation module for associating a sequence of control commands with the target trajectory.

BACKGROUND INFORMATION

Systems for the remote control of motor vehicles are described in German Patent Application No. DE 10 2012 200 725 A1. These involve in particular systems with which a user, who is outside a motor vehicle, may initiate and carry out driving maneuvers with the aid of a remote control device. In particular for maneuvering in situations which ensure only limited visibility from the vehicle, the driver of the vehicle may place him/herself in a position outside the vehicle, from which, for example, narrow spaces between the driver's vehicle and its surroundings may be more easily estimated and appropriate steering or control maneuvers for the vehicle may be more reliably carried out.

SUMMARY

In a first aspect, the present invention relates to a communication module for controlling a motor vehicle, which is configured for receiving vehicle-independent commands and converting these received commands into a target trajectory of the motor vehicle, and transmitting this target trajectory to an implementation module which is configured for associating a sequence of control commands for components of the motor vehicle with this transmitted target trajectory.

In this regard, a target trajectory element, for example, a pattern of a setpoint value of the kinematic motion of the motor vehicle, i.e., a pattern of setpoint values of variables which describe the kinematic motion of the motor vehicle.

Components of the motor vehicle refer, for example, to actuators or sensors of the motor vehicle. A control command for an actuator is an actuator control, for example, and a control command for a sensor is a sensor query, for example.

Such a communication module has the advantage that for programs which output vehicle-independent commands, it provides an option for controlling the motor vehicle. For example, it is thus possible to provide functions for the motor vehicle as downloadable applications, for example as apps in a smart phone.

Classical vehicle functions may still be implemented nowadays very close to hardware; i.e., their programming requires specific instructions to individual actuators, such as "Set the throttle valve to angle x."

The more closely the implementation of a function is formulated on the later hardware, the more complicated it is to transfer the implementation to a different hardware. This porting effort is already a problem in classical software development.

The interest of the end customers in current app systems depends greatly on the quantity of apps offered and their continuous further development. This market is often serviced by freelance developers. Interfaces which are too close to hardware result in effort in the porting to other motor vehicle models and for maintenance of the functions. As a result, the number and up-to-dateness of the app-based functionalities available for a motor vehicle model decrease. An additional problem for the market of automobile apps is that apps should ideally be offered over a service life of 10-15 years for each vehicle model.

The mentioned communication module has the advantage of reducing the development effort as well as the porting effort. The communication module thus improves the prospects for establishing app systems for the motor vehicle. The vehicle-dependent part may be completely encapsulated in the implementation module, which is implemented in the motor vehicle, for example.

The interfaces offered with this communication module for the implementation, namely, the components for receiving the vehicle-independent commands, are based on the driver actions and underlying driver intents necessary for a functionality, and not on the hardware of a target system.

The advantage is that the driver intent has remained largely unchanged over several hundred years. Assuming that a driver desires to accelerate, prior to the automobile, the driver signaled this intent to the horse via the whip, and in the earlier days of the automobile, via the mechanical influence on the quantity of fuel and air in the combustion process. In the future, this intent may possibly be acoustically detected and translated into a mix of electric and hydraulic feed. The underlying intent for acceleration has thus remained the same. If this intent had been formulated too closely to the target hardware, in this example the function would have to be completely redesigned three times.

Thus, with the described communication module, the programmer needs to implement the function only once. In addition, the description of the driver actions and intents as implementation of an app requires a much smaller overall knowledge base, since now, the developer no longer has to know the vehicle-specific properties of different motor vehicle models.

The communication module may be implemented in software, or in hardware, or in a mixed form composed of software and hardware.

In another aspect, it may be provided that the communication module transmits the target trajectory to the implementation module via a wireless connection. This is advantageous, for example, when the communication module is used on a mobile communication device, for example a laptop or a smart phone. Transmission to the implementation module, which is implemented in the motor vehicle, for example, may then take place via a wireless communication provided by the mobile communication device. Of course, in another aspect, a wired transmission of the target trajectory from the communication module to the implementation module is possible. This would have the advantage that the transmission is particularly reliable, which may be important when potentially safety-critical commands are also to be transmitted via the communication module.

For implementing the target trajectories in commands, in another aspect it may be provided that standard commands with which standard target trajectories are associated (in a list, for example) are stored in the communication module. The communication module may then be configured for associating the command with one or more of the stored standard commands during the conversion of the received commands into the target trajectory. For example, it is possible for the command to be representable as a sequence of the stored standard commands, and for the command to then be correspondingly associated with this sequence of standard commands.

The communication module may then be configured for selecting the target trajectory as a function of the standard target trajectory which is associated with the standard command. If a sequence of standard commands is associated with the command, it may be provided that the target trajectory is then selected as a sequence of the standard target trajectories associated with these standard commands.

The implementation of the target trajectories in commands is particularly simple when the communication module is configured in this way. A vehicle function which is to be implemented by an app, for example, may then be conceptualized and designed in a particularly simple manner as a series of driver actions. The communication module is correspondingly designed, and together with the standard commands provides speech elements and functions in order to list these driver actions (or even more abstractly, the underlying driver intents) in a way that may be interpreted by machine; i.e., the communication module provides its own programming language, on the basis of which the app may operate. Thus, the developer also initially programs this type of app as a number of coordinated driver actions, which reduces the development effort.

In one refinement, it may be provided that the communication module is configured for also associating parameter values, in addition to the standard command, with the command during the conversion of the received command into the target trajectory. This means that the standard commands are parameterizable.

This yields the advantage that the area covered by standard commands is expanded, and the communication module thus becomes particularly flexible.

It may then be provided that the target trajectory is also a function of the associated parameter values.

In particular, it may be provided that the target trajectory is provided as a sequence of standard target trajectories and/or as a sequence of parameter values. This means that when a sequence of parameterized standard commands is associated with the command, it may then be provided that the target trajectory is made up of a sequence of correspondingly parameterized standard target trajectories.

In a further aspect, the present invention relates to the implementation module for controlling the motor vehicle, which is configured for receiving the target trajectory of the motor vehicle from the communication module and for associating a sequence of control commands for components of the motor vehicle with the received target trajectory. This implementation module has the advantage that the target trajectory may be independent of particulars of the internal control of the motor vehicle, and the vehicle-dependent pieces of information need be provided only in the implementation module, which makes it possible to use particularly flexible communication modules.

The program which transmits the vehicle-independent commands to the communication module then describes overall a target trajectory, which is transmitted to the implementation module. If the communication module is implemented outside the motor vehicle and the implementation module is implemented in the motor vehicle, this target trajectory may thus be loaded on the vehicle. No later than the point in time of the implementation of this target trajectory by the motor vehicle (which may take place at a different time than the transmission of the target trajectory), the association with the sequence of control commands then takes place via the implementation module. With the association, the implementation module thus carries out a translation into control commands which is a function of the particular motor vehicle model, and which may be optimized for the actuators and sensors installed there.

In a further aspect, it may be provided that the implementation module includes a memory module on which the target trajectory and the associated sequence of control commands are stored; i.e., the implementation module is configured for storing the target trajectory and the associated sequence of control commands on the memory module. This means that the translation of the commands from a level of the driver actions and intents to the level of specific sensor queries and actuator controls may thus take place statically, for example in the motor vehicle. This has the advantage that a corresponding translation by the implementation module need take place only once, for example after downloading the target trajectory or prior to the first execution, i.e., prior to the first implementation of the target trajectory.

In a further aspect, it may be provided that the target trajectory includes a sequence of standard target trajectories, and in the implementation module, in each case a sequence of control commands for components of the motor vehicle is associated with each of the standard target trajectories.

It may also be provided that the implementation module is part of an upstream infrastructure, and is not implemented in the motor vehicle. In this case as well, the developer requires no knowledge of the motor vehicle. Adjustments to the motor vehicle model may take place automatically in the infrastructure.

In another aspect, it may be provided that the implementation module is configured for transmitting the associated sequence of control commands to a control unit of the motor vehicle to thus allow the control commands, and ultimately the implementation of the target trajectory, to be carried out.

In another aspect, the present invention relates to a communication system which includes the communication module and the implementation module.

BRIEF DESCRIPTION OF THE DRAWINGS

The figures show particularly advantageous specific embodiments of the present invention.

DETAILED DESCRIPTION OF EXAMPLE EMBODIMENTS

Figure 1:
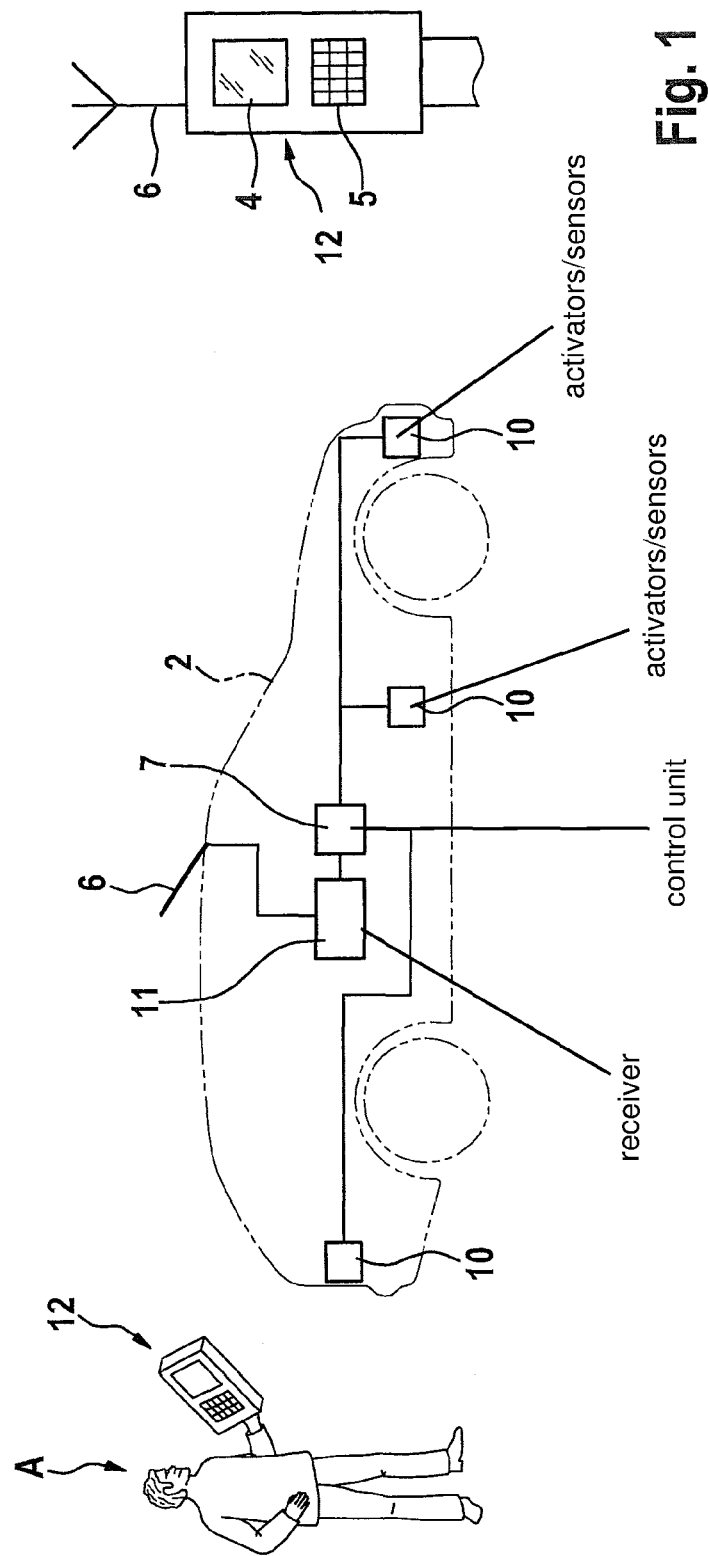
FIG. 1 schematically shows the system for controlling the motor vehicle.

FIG. 1 shows a motor vehicle 2 which is controlled by a user A with the aid of a smart phone 12, as an example. Smart phone 12 includes a screen 4, a keyboard 5, and an antenna 6. For example, an app for parking motor vehicle 2 is implemented on smart phone 12.

Motor vehicle 2 likewise includes an antenna 6 via which the motor vehicle may communicate with smart phone 12. The commands received via antenna 6 are supplied to a receiver 11. The receiver transmits to a control unit 7 control commands for actuators and/or sensors 10 which may be controlled by control unit 7.

Figure 2:
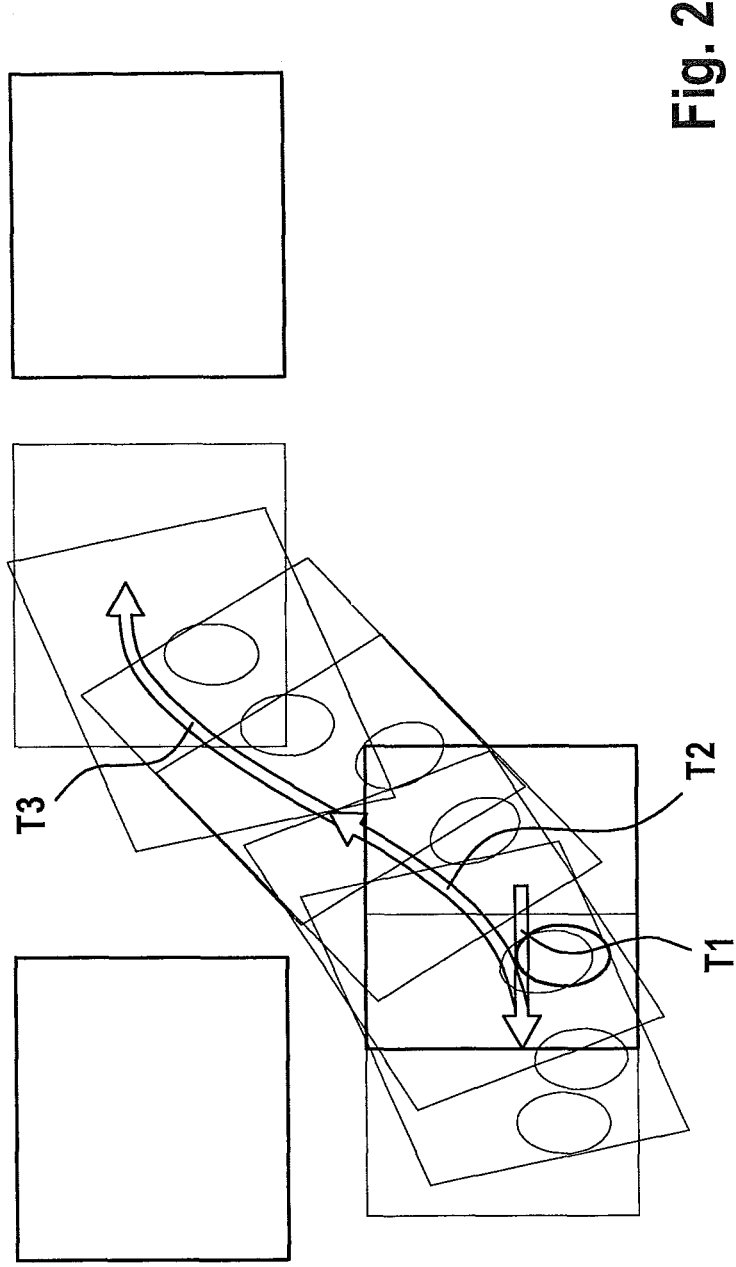
FIG. 2 shows an illustration of a target trajectory.

FIG. 2 shows an example of a parking operation of motor vehicle 2. A program is running on smart phone 12 which controls the parking operation by way of example. This program may be configured, for example, for placing motor vehicle 2 at a distance of 50 cm in parallel to a sufficiently large space, so that the motor vehicle ends up at eye level with the obstacle. This program is formulated independently of the vehicle, and has the following appearance, for example:

DriveSlowlyForward(route=DistanceToVehicle(driver, rear bumper));
DriveSlowlyBackwardsWithSlightSteeringAngleToTheRight(routeY=0.5*vehicle width+25 cm);
DriveSlowlyBackwardsWithModerateSteeringAngleToTheLeft(routeY=0.5*vehicle width+25 cm);

The program commands are independent of the internal design of the motor vehicle. The program commands are parameterizable with vehicle-dependent variables. For example, either these variables may be transmitted from motor vehicle 2 to smart phone 12, or motor vehicle 2 may transmit a vehicle identifier to smart phone 12 so that smart phone 12 may retrieve these parameters from a database. In this regard, the programmer of this program function does not require knowledge of the internal design of the motor vehicle.

The command "DriveSlowlyForward(route=DistanceToVehicle(driver, rear bumper))"; guides motor vehicle 2 along first partial trajectory T1, as illustrated in FIG. 2.

The command
"DriveSlowlyBackwardsWithSlightSteeringAngleToTheRight(routeY=0.5*vehicle width+25 cm)"; guides motor vehicle 2 along second partial trajectory T2.

The command
"DriveSlowlyBackwardsWithModerateSteeringAngleToTheLeft(routeY=0.5*vehicle width+25 cm)"; guides motor vehicle 2 along third partial trajectory T3.

Figure 3:
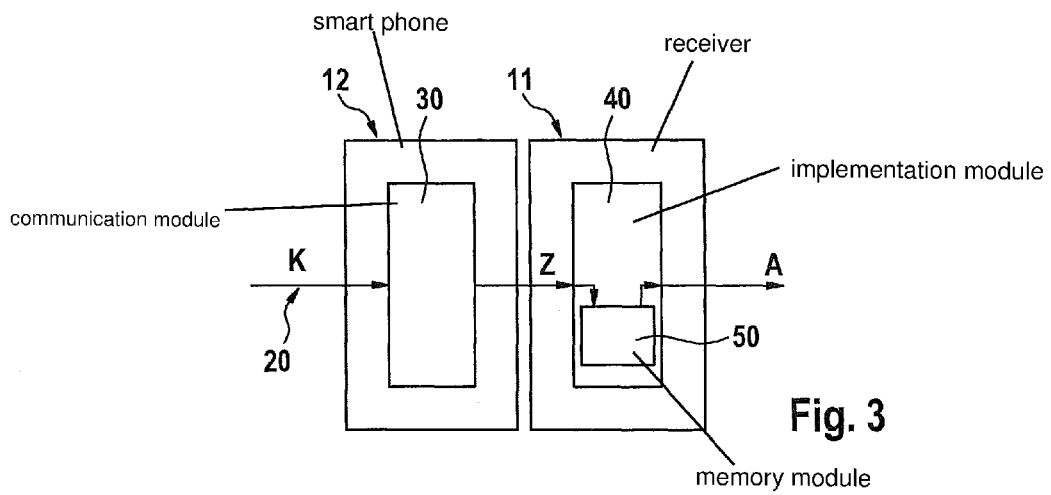
FIG. 3 shows a first system of the communication module and the implementation module.

FIG. 3 shows a first possible system of communication module 30 and implementation module 40. Communication module 30 is situated in smart phone 12, for example. The communication module receives commands K from the program, for example the command DriveSlowlyForward(route=DistanceToVehicle(driver, rear bumper));

The communication module converts this command K into a target trajectory Z, in this case first partial trajectory T1. This target trajectory Z is transmitted to implementation module 40, which in this exemplary embodiment is situated in receiver 11. In the implementation module, target trajectory Z is associated with a sequence A of control commands. These control commands include, for example, commands for opening a throttle valve, for setting an injection quantity, for precisely detecting the instantaneous position of motor vehicle 2, etc. These control commands A are stored in memory module 50, which is located in implementation module 40. When implementation module 40 receives a signal for implementation from smart phone 12 via communication module 30, for example, a sequence A of control commands is transmitted to control unit 7, which controls components 10 corresponding to this sequence A.

Figure 4:
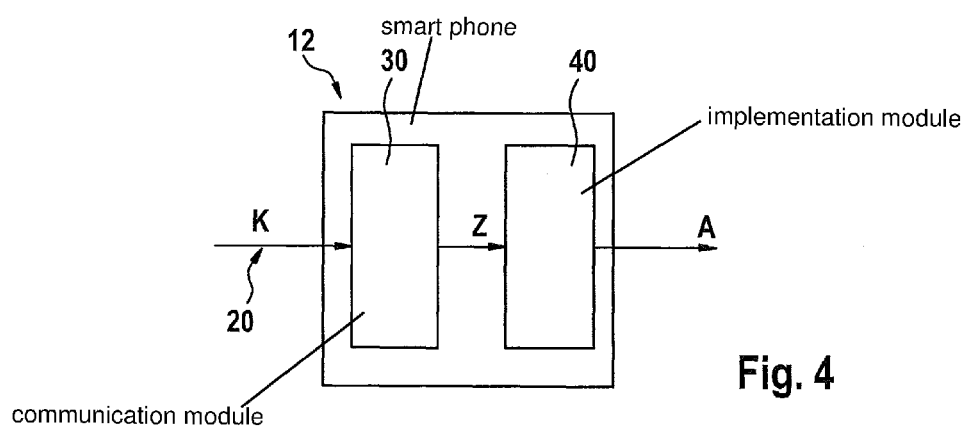
FIG. 4 shows a second system of the communication module and the implementation module.

FIG. 4 shows a second possible system of communication module 30 and implementation module 40. In this exemplary embodiment, both are situated in smart phone 12. In this example, the implementation module, in contrast to the exemplary embodiment illustrated in FIG. 3, has no memory module 50. In this case, commands K are directly implemented in a sequence A of control commands, which are then transmitted to receiver 11 (via antenna 6), which then relays the control commands to control unit 7 for implementation.

Figure 5:
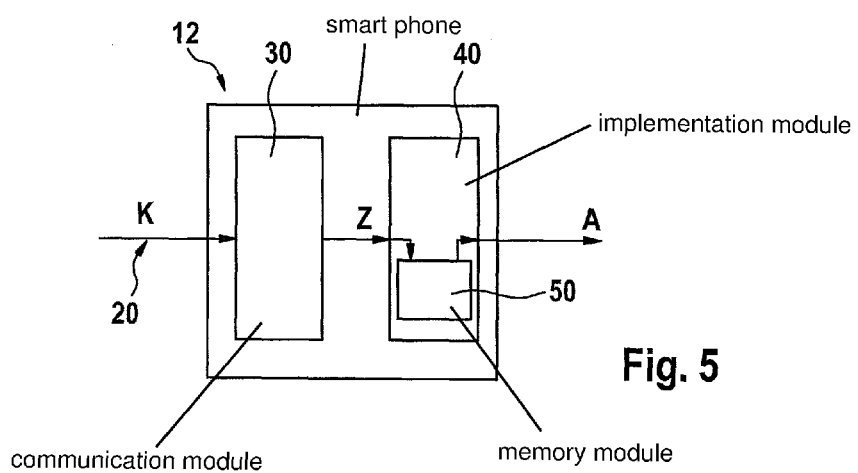
FIG. 5 shows a third system of the communication module and the implementation module.

FIG. 5 shows a third possible system of communication module 30 and implementation module 40. In contrast to the exemplary embodiment illustrated in FIG. 3, in this exemplary embodiment communication module 30 is also situated in receiver 11. In this case, smart phone 12 transmits command K to receiver 11.

In all of these exemplary embodiments, it may be important to provide means for the correct chronological disposition of the temporal sequence of the control commands in control unit 7. It is possible, for example, to provide a control command with an individual time stamp which encodes the time at which the control command is to be executed. This is carried out by implementation module 40, for example.

What is claimed is:

1. A communication module to control a motor vehicle, the communication module configured to receive vehicle-independent commands and convert received commands into a target trajectory of the motor vehicle, and transmit the target trajectory to an implementation module which is configured for associating a sequence of control commands for components of the motor vehicle with this transmitted target trajectory, wherein standard commands with which standard target trajectories are associated are stored in the communication module, and the communication module is configured to associate the command with one of the stored standard commands during the conversion of the received commands into the target trajectory, and wherein at least one of:

the target trajectory is a function of the standard target trajectory which is associated with the standard command; or the communication module is configured to also associate parameter values with the command during the conversion of the received command into the target trajectory, and the target trajectory is a function of the associated parameter values.

2. The communication module as recited in claim 1, wherein the communication module is configured to transmit the target trajectory to the implementation module via a wireless connection.

3. The communication module as recited in claim 1, wherein the target trajectory is a function of the standard target trajectory which is associated with the standard command.

4. The communication module as recited in claim 1, wherein the target trajectory is a function of the associated parameter values.

5. The communication module as recited in claim 4, wherein the target trajectory is provided at least one of: i) as a sequence of standard target trajectories, and ii) as a sequence of parameter values.

6. An implementation module to control a motor vehicle, which is configured to receive a target trajectory of the motor vehicle from a communication module, and associate a sequence of control commands for components of the motor vehicle with the received target trajectory, wherein the target trajectory includes a sequence of standard target trajectories, and in the implementation module, in each case a sequence of control commands for components of the motor vehicle is associated with each of the standard target trajectories.

7. The implementation module as recited in claim 6, wherein the implementation module is situated in the motor vehicle.

8. The implementation module as recited in claim 6, including a memory module on which the target trajectory and the associated sequence of control commands are stored.

9. The implementation module as recited in claim 6, wherein the implementation module is configured to transmit the associated sequence of control commands to a control unit of the motor vehicle.

10. A communication system which includes a communication module and an implementation module, the communication module configured to receive vehicle-independent commands and convert received commands into a target trajectory of the motor vehicle, and transmit the target trajectory to an implementation module which is configured for associating a sequence of control commands for components of the motor vehicle with this transmitted target trajectory, the implementation module configured to receive a target trajectory of the motor vehicle from the communication module, and associate a sequence of control commands for components of the motor vehicle with the received target trajectory.

* * * * *